(12) United States Patent
Shalhoub

(10) Patent No.: US 7,631,910 B2
(45) Date of Patent: Dec. 15, 2009

(54) PORTABLE DOG WASTE COLLECTOR

(76) Inventor: Dan Shalhoub, 144 N. 60th St., Milwaukee, WI (US) 53213

( * ) Notice: Subject to any disclaimer, the term of this patent is extended or adjusted under 35 U.S.C. 154(b) by 173 days.

(21) Appl. No.: 11/839,694

(22) Filed: Aug. 16, 2007

(65) Prior Publication Data

US 2009/0045639 A1    Feb. 19, 2009

(51) Int. Cl.
*A01K 29/00* (2006.01)
*E01H 1/12* (2006.01)

(52) U.S. Cl. ....................................................... 294/1.5

(58) Field of Classification Search .................. 294/1.3, 294/1.4, 1.5, 19.1; 15/144.4, 257.6, 257.7
See application file for complete search history.

(56) References Cited

U.S. PATENT DOCUMENTS

| | | | |
|---|---|---|---|
| 3,617,084 A * | 11/1971 | Mares .......................... | 294/1.4 |
| 3,868,135 A * | 2/1975 | Magliaro ...................... | 294/1.5 |
| 4,037,867 A * | 7/1977 | Fano et al. .................... | 294/1.4 |
| 4,042,269 A * | 8/1977 | Skermetta .................... | 294/1.5 |
| 4,236,741 A | 12/1980 | Emme | |
| 4,262,948 A | 4/1981 | Emme | |
| 4,776,621 A | 10/1988 | Streit | |
| 4,819,977 A | 4/1989 | Cooper | |
| D334,255 S | 3/1993 | Nelson | |
| 5,269,575 A | 12/1993 | Parvaresh | |
| 5,971,452 A | 10/1999 | Marymor et al. | |
| 6,039,370 A * | 3/2000 | Dooley et al. ................ | 294/1.5 |
| 6,164,710 A | 12/2000 | Shibuya | |
| 6,941,897 B1 | 9/2005 | Rosales | |
| 7,032,940 B1 | 4/2006 | Smith | |
| 7,040,677 B1 | 5/2006 | Wickser, Jr. | |
| 7,090,268 B2 | 8/2006 | Borman | |
| 7,261,347 B2 * | 8/2007 | Krieger ........................ | 294/1.4 |
| 2005/0258655 A1 | 11/2005 | Matthews et al. | |
| 2005/0275228 A1 | 12/2005 | Davis | |
| 2006/0157994 A1 | 7/2006 | Anderson | |

* cited by examiner

*Primary Examiner*—Dean J Kramer
(74) *Attorney, Agent, or Firm*—Dale J. Ream

(57) ABSTRACT

A portable dog waste collector comprised of: a telescoping arm; a handle at a first end of the telescoping arm; a receptacle at a second end of the telescoping arm, in which the receptacle forms an open-topped chamber and has a bottom surface with at least one aperture; and a disposable insert into which solid and-semi-solid dog waste can be collected. In alternate embodiments of the portable dog waste collector, the disposable insert includes a lid to prevent spillage of the dog waste and/or a strap to facilitate removal of the disposable insert, a wrist loop on the handle, and a retracting handle to allow easy retraction of the telescoping arm. Further, the disposable insert can be made of a biodegradable material, recycled plastic, or non-recycled plastic.

18 Claims, 2 Drawing Sheets

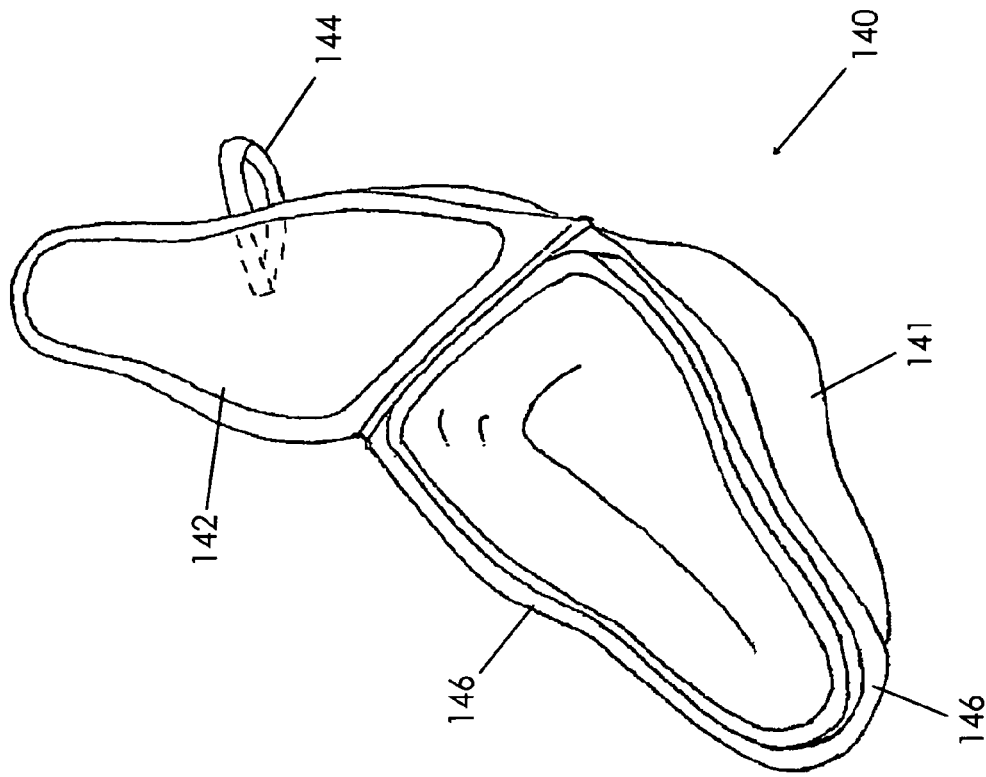
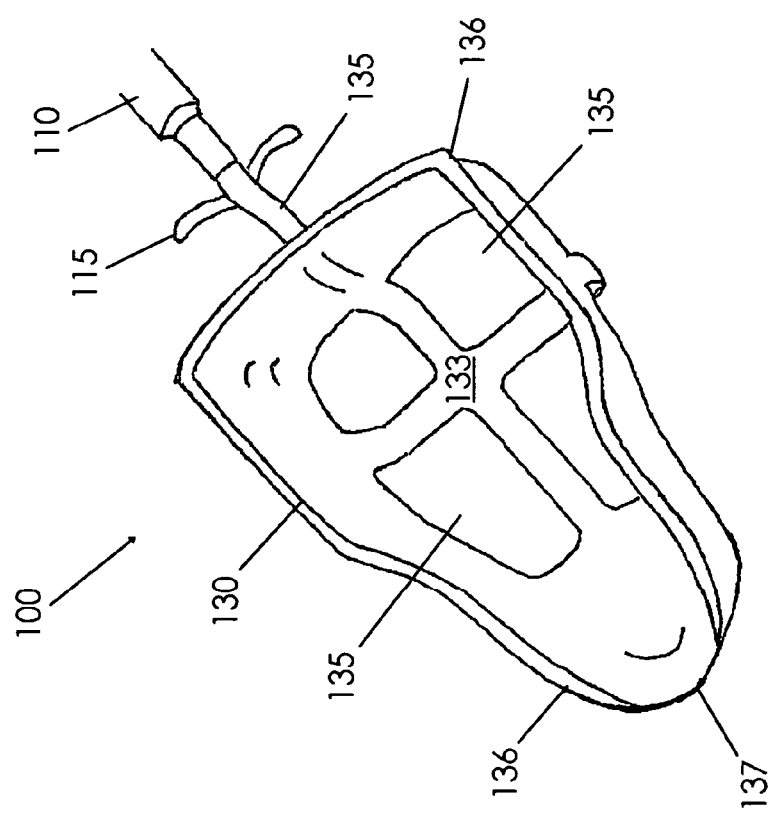

PORTABLE DOG WASTE COLLECTOR

FIELD OF INVENTION

This invention relates generally to the field of animal waste collection, and in particular to the field of a portable device for collecting solid and semi-solid dog excrement.

BRIEF DESCRIPTION OF THE DRAWINGS

FIG. 2 shows a top perspective view of one embodiment of the receptacle.

FIG. 3 shows a top perspective view of one embodiment of the disposable insert.

BACKGROUND

Figure 1:
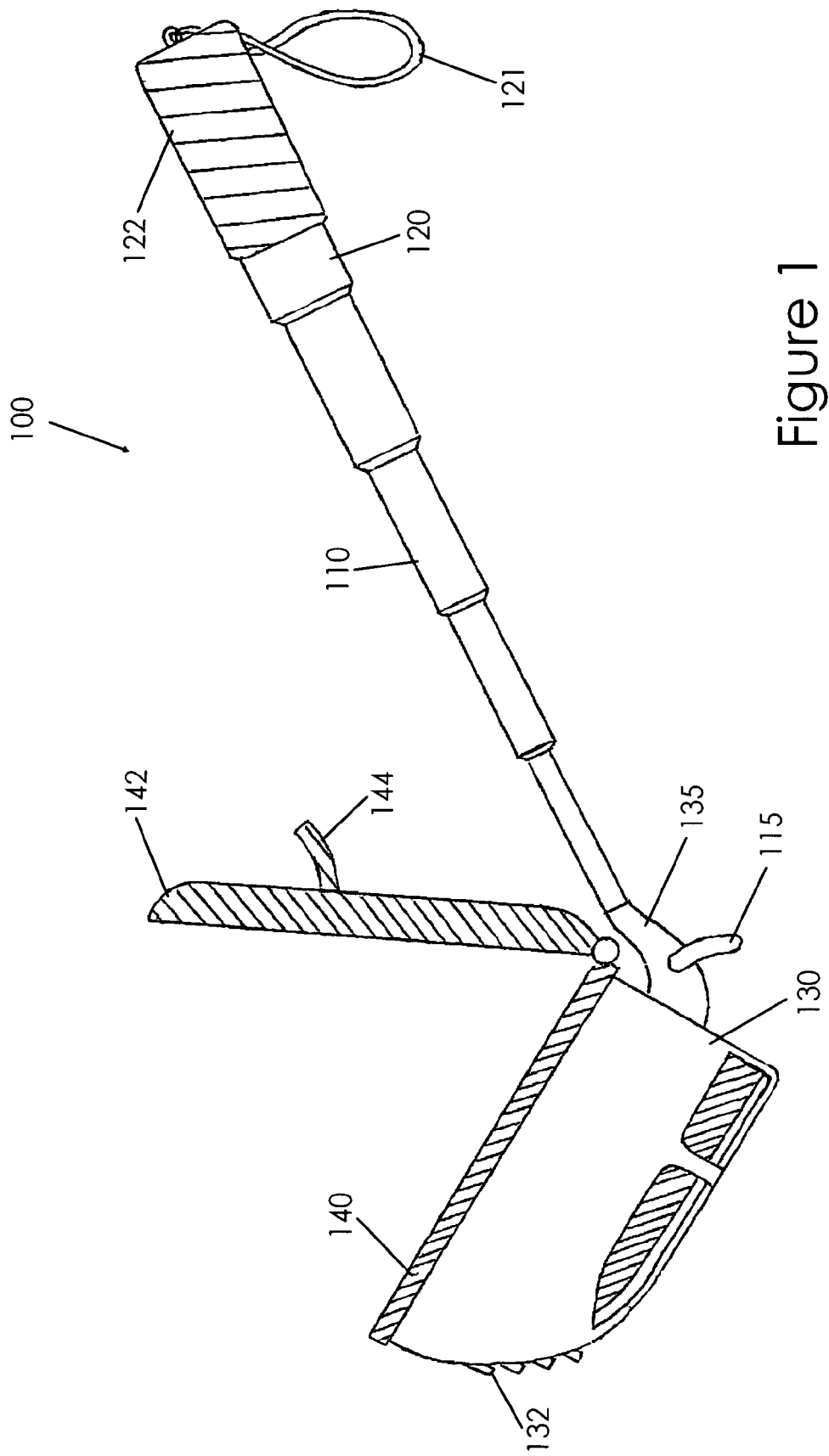
FIG. 1 shows a side view of one embodiment of the portable dog waste collector, in an extended position.

Nearly fifty million (50,000,000) households own at least one dog. Many municipalities have public ordinances requiring that the owner of the dog remove the excrement. In those that do not require it, it is often nonetheless desirable to collect and dispose of the excrement.

There have been many devices in existence to assist in dog waste material retrieval. Many of these devices require the bending, scooping, lifting of the material, and transporting the material for disposal, any of which can result in soiling the hands or clothing of the dog owner or only partial removal of the waste. Thus, whether walked at a public area or en route to the public area, a need exists for an apparatus that allows the owner to quickly and easily collect and dispose of the dog's excrement.

As used herein, the term "protuberances" refers to any bump, protrusion, extension, texture or irregularity which increases friction or resistance.

As used herein, the terms "dog waste" and "dog excrement" refer to solid or semi-solid waste matter, especially fecal matter, that is expelled or otherwise discharged from a dog after digestion.

DETAILED DESCRIPTION OF EMBODIMENTS OF THE INVENTION

For the purpose of promoting an understanding of the present invention, references are made in the text hereof to embodiments of a portable dog waste collector, only some of which are depicted in the figures. It should nevertheless be understood that no limitations on the scope of the invention are thereby intended. One of ordinary skill in the art will readily appreciate that modifications such as the dimensions, size, and shape of the components, alternate but functionally similar materials from which the portable dog waste collector is made, and the inclusion of additional elements are deemed readily apparent and obvious to one of ordinary skill in the art, and all equivalent relationships to those illustrated in the drawings and described in the written description do not depart from the spirit and scope of the present invention. Some of these possible modifications are mentioned in the following description. Therefore, specific details disclosed herein are not to be interpreted as limiting, but rather as a basis for the claims and as a representative basis for teaching one of ordinary skill in the art to employ the present invention in virtually any appropriately detailed apparatus or manner.

It should be understood that the drawings are not necessarily to scale, emphasis instead being placed upon illustrating the principles of the invention. In addition, in the embodiments depicted herein, like reference numerals in the various drawings refer to identical or near indentical structural elements.

Moreover, the term "substantially" or "approximately" as used herein may be applied to modify any quantitative representation that could permissibly vary without resulting in a change in the basic function to which it is related. For example, one embodiment of the portable dog waste collector is disclosed herein as having a rounded retracting handle. The retracting handle might permissibly be somewhat non-rounded, i.e., straight, or have a number of straight portions, ire., one (1) or more bends, and still be within the scope of the invention if its functionality is not materially altered.

Referring now to the drawings, FIG. 1 shows a side view of one embodiment of portable dog waste collector 100, in an extended position. In the embodiment shown, portable dog waste collector 100 is comprised of telescoping arm 110, handle 120 at a first end, receptacle 130 at the opposing end, and disposable insert 140 that can be positioned within receptacle 130.

In the embodiment shown, telescoping arm 110 is comprised of five (5) portions, handle 120 and four (4) telescoping portions that retract into each another. Each of the four (4) telescoping portions is approximately seven inches (7") long, and handle 120 is approximately nine inches (9") long. When retracted, telescoping arm 110 is approximately one foot (1') long, and when extended, telescoping arm 110 is approximately thirty-nine inches (39") long. Telescoping arm 110 allows portable dog waste collector 100 to be retracted for easy carrying or storage when not in use and extended to allow receptacle 130 (discussed in greater detail infra) to be positioned beneath a dog (not shown) to collect the dog's waste. In the embodiment shown, telescoping arm 110 is made of aluminum, but one of ordinary skill in the art will appreciate that telescoping arm 110 can be made of any sufficiently strong and durable material. It should also be understood that telescoping arm 110 could have any number of telescoping portions, including as few as two (2) and that both handle 120 and the telescoping portions can be of any length.

In the embodiment shown, at one end of telescoping arm 110 is handle 120. Handle 120 allows a user of portable dog waste collector 100 to easily grasp portable dog waste collector 100. In the embodiment shown, handle 120 includes a rubber piece positioned on handle 120 of telescoping arm 110, but can be made of any material. In addition, handle 120 can include a textured surface to allow easy gripping of handle 120. Also in the embodiment of portable dog waste collector 100 shown in FIG. 1 is wrist loop 121. Wrist loop 121 further prevents portable dog waste collector 100 from slipping out of the user's hand when being carried or in use. It should be understood, however, that wrist loop 121 need not be included in every embodiment of portable dog waste collector 100.

Also visible in FIG. 1 is receptacle 130, positioned at an end of telescoping arm 110 opposite that of handle 120. Receptacle 130 is oriented at an angle relative to telescoping arm 110 for ease of use and, in the embodiment shown, is connected to telescoping arm 110 by neck 135. However, it should be understood that receptacle 130 can be connected to telescoping arm 110 by any means commonly known in the art, including connecting receptacle 130 to telescoping arm 110 without the use of a connector (i.e., without neck 135) or forming telescoping arm 110 and receptacle 130 as one integral piece.

FIG. 2 shows a top perspective view of one embodiment of receptacle 130. Receptacle 130 forms chamber 133, into which the disposable insert (not shown in FIG. 2; discussed in detail infra) can be positioned. Chamber 133 has an open top to allow the disposable insert to be positioned within chamber 133. Receptacle 130 further includes four (4) receptacle apertures 135. Receptacle apertures 135 are large enough to allow the solid or semi-solid dog waste to pass through, thereby necessitating that the disposable insert be positioned within chamber 133 in order for portable dog waste collector 100 to be used properly, i.e., to collect the dog waste. The embodiment of receptacle 130 includes four (4) receptacle apertures 135. However, it should be understood that any number of receptacle apertures 135 can be included as long as receptacle 130 can hold the disposable insert.

Referring again to the embodiment of portable dog waste collector 100 shown in FIG. 1, receptacle 130 further includes non-skid element 132. In the embodiment shown, non-skid element 132 is a plurality of small protuberances that minimize slippage of portable dog waste collector 100 when positioned on the ground below the dog. It should be understood that alternate types of non-skid elements 132 could be used, including a textured bottom surface, a rubber layer, or a combination of non-skid elements.

In the embodiment shown, receptacle 130 is made of plastic, but can be made of any alternate material that is sufficiently strong and durable, e.g., aluminum, known and used by those of ordinary skill in the art.

Also visible in the embodiment of portable dog waste collector 100 shown in FIGS. 1 and 2 are retracting handles 115. Retracting handles 115 allow the user a point to grasp and retract telescoping arm 110 when collection of the dog waste is complete. In the embodiment shown, two (2) retracting handles 115 are integrally formed on neck 135 and are slightly arcuate. It should be understood that retracting handles 115 could be of any shape, including arcuate, straight, bent, or combinations thereof. In addition, retracting handles 115 could be positioned on the lowermost portion of telescoping arm 110 or directly on receptacle 130, regardless of whether portable dog waste collector 100 includes neck 135.

Referring to FIGS. 2 and 3 collectively, also visible in FIG. 2 is lip 136, which extends outward from the top of receptacle 130. Lip 136 extends substantially around the uppermost portion of receptacle 130 except for forward portion 137. Lip 136 corresponds with insert lip 146 of disposable insert 140 (shown in FIG. 3) to support disposable insert 140. Insert lip 146 of disposable insert 140, however, extends the entire circumference of disposable insert 140. Thus, when disposable insert 140 is positioned within receptacle 130, insert lip 146 extends forward of receptacle 130 at forward portion 137, providing an easy place for the user to remove disposable insert 140 from receptacle 130. It should be understood that in such an embodiment, disposable insert 140 need not also include handle 144. However, in order to facilitate removal of disposable insert 140, various embodiments of portable dog waste collector 100 can have just handle 144 on disposable insert 144, receptacle 130 with lip 136 extending only partially around receptacle 130, or both.

Also shown in the embodiment of portable dog waste collector 100 is disposable insert 140. FIG. 3 shows a top perspective view of one embodiment of disposable insert 140, which is made of a thin plastic. Disposable insert 140 includes receiver portion 141 and lid portion 142 and is made of a complimentary shape to allow it to be positioned within the chamber (not shown) of the receptacle (not shown) of the portable dog waste collector (not shown). Lid 142 allows disposable insert 140 to enclose the waste so that the disposable insert 140 can be removed and discarded. In the embodiment of disposable insert 140 shown in FIG. 3, lid further includes strap 144, which allows disposable insert 140 to be quickly and easily removed from the receptacle. However, it should be understood that alternate embodiments of disposable insert 140 need not include strap 144.

Disposable insert 140 allows the waste to be collected and disposed of without dirtying the receptacle and/or other components of the portable dog waste collector. In the embodiment shown, insert 140 is made of recycled plastic, but can alternately be made of a bio-degradable material, non-recycled plastic, or any other material commonly known and used in the art. The use of a biodegradable material allows disposable insert 140 and any excrement contained therein to be disposed of and broken down without long-term negative environmental effects.

While the portable dog waste collector has been shown and described with respect to several embodiments and uses in accordance with the present invention, it is to be understood that the same is not limited thereto, but is susceptible to numerous changes and modifications as known to a person of ordinary skill in the art, and it is intended that the present invention not be limited to the details shown and described herein, but rather cover all such changes and modifications obvious to one of ordinary skill in the art.

I claim:

1. A portable dog waste collector comprised of:
    a telescoping arm having a first end and a second end;
    a handle at said first end of said telescoping arm;
    a receptacle at said second end of said telescoping arm, said receptacle having a bottom surface and forming an open-topped chamber, said bottom surface having at least one aperture;
    a non-skid element positioned on said bottom surface of said receptacle;
    a disposable insert, said disposable insert having a lid and formed to fit within said receptacle; and
    a strap to facilitate removal of said disposable insert.

2. The portable dog waste collector of claim 1, wherein said telescoping arm and said receptacle are made of a material selected from a group comprised of aluminum and plastic.

3. The portable dog waste collector of claim 1, wherein said handle is further comprised of a gripping mechanism selected from a group comprised of a rubber layer positioned thereon and a textured surface.

4. The portable dog waste collector of claim 1, wherein said non-skid element is selected from a group comprise of a plurality of protuberances, said bottom surface of said receptacle being textured, a rubber layer, and combinations thereof.

5. The portable dog waste collector of claim 1, wherein said disposable insert is made of a material selected from a group comprised of a bio-degradable material, a recycled plastic, and a non-recycled plastic.

6. The portable dog waste collector of claim 1, wherein said portable dog waste collector further includes at least one retracting handle to facilitate retracting said telescoping arm.

7. A device comprised of:
    a telescoping arm having a first end and a second end;
    a handle at said first end of said telescoping arm;
    a receptacle at said second end of said telescoping arm, said receptacle having a bottom surface and forming an open-topped chamber, said bottom surface having at least one aperture;
    a non-skid element positioned on said bottom surface of said receptacle;
    at least one retracting handle to facilitate retracting said telescoping arm, said at least one retracting handle positioned at said second end of said telescoping arm; and a disposable insert, said disposable insert having a lid and formed to fit within said receptacle.

8. The device of claim 7, wherein said telescoping arm and said receptacle are made of a material selected from a group comprised of aluminum and plastic.

9. The device of claim 7, wherein said handle is further comprised of a gripping mechanism selected from a group comprised of a rubber layer positioned thereon and a textured surface.

10. The device of claim 7, wherein said disposable insert is further comprised of a strap to facilitate removal of said disposable insert.

11. The device of claim 7, wherein said non-skid element is selected from a group comprise of a plurality of protuberances, said bottom surface of said receptacle being textured, a rubber layer, and combinations thereof.

12. The device of claim 7, wherein said disposable insert is made of a material selected from a group comprised of a biodegradable material, a recycled plastic, and a non-recycled plastic.

13. A system for collecting dog waste comprised of:
a plurality of disposable inserts, each of said plurality of disposable inserts having a circumferential lip and a lid;
a telescoping arm having a first end and a second end;
a handle at said first end of said telescoping arm;
a receptacle at said second end of said telescoping arm, said receptacle having a bottom surface with at least one aperture and at least one non-skid element positioned thereon, wherein said receptacle forms an open-topped chamber in to which one of said plurality of disposable inserts fits, and wherein said receptacle has a partially circumferential lip allowing access to said circumferential lip of one of said plurality of disposable inserts when positioned within said chamber to allow removal of one of said plurality of disposable inserts once used; and
at least one retracting handle to facilitate retracting said telescoping arm, said at least one retracting handle positioned at said second end of said telescoping arm.

14. The system of claim 13, wherein said telescoping arm and said receptacle are made of a material selected from a group comprised of aluminum and plastic.

15. The system of claim 13, wherein said handle is further comprised of a gripping mechanism selected from a group comprised of a rubber layer positioned thereon and a textured surface.

16. The system of claim 13, wherein each of said plurality of disposable inserts is further comprised of a strap to facilitate removal of said disposable insert.

17. The system of claim 13, wherein said non-skid element is selected from a group comprise of a plurality of protuberances, said bottom surface of said receptacle being textured, a rubber layer, and combinations thereof.

18. The system of claim 13, wherein each of said plurality of disposable inserts is made of a material selected from a group comprised of a bio-degradable material, a recycled plastic, and a non-recycled plastic.

* * * * *